United States Patent
Wann et al.

(10) Patent No.: US 12,212,428 B2
(45) Date of Patent: *Jan. 28, 2025

(54) NETWORK SYSTEM HAVING A NETWORK APPLIANCE

(71) Applicant: Duke Manufacturing Co., St. Louis, MO (US)

(72) Inventors: Benjamin Wann, Kirkwood, MO (US); Brian Heuckroth, St. Louis, MO (US); Canyon DeVille, Lake St. Louis, MO (US); Kwame Bamfo-Agyei, Hazelwood, MO (US); Norman Bernard, Clark Freeport Zone (PH); Brian Rain, St. Louis, MO (US)

(73) Assignee: DUKE MANUFACTURING CO., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,372

(22) Filed: Jul. 10, 2023

(65) Prior Publication Data

US 2023/0353414 A1 Nov. 2, 2023

Related U.S. Application Data

(63) Continuation of application No. 17/643,994, filed on Dec. 13, 2021, now Pat. No. 11,729,015, which is a
(Continued)

(51) Int. Cl.
*H04L 12/28* (2006.01)
*G06Q 10/0631* (2023.01)
(Continued)

(52) U.S. Cl.
CPC ....... *H04L 12/283* (2013.01); *G06Q 10/0631* (2013.01); *G06Q 10/087* (2013.01);
(Continued)

(58) Field of Classification Search
CPC ..... H04L 12/283; H04L 67/12; H04L 67/562; H04L 12/4641; H04L 2012/285;
(Continued)

(56) References Cited

U.S. PATENT DOCUMENTS 7,523,302 B1 4/2009 Brown et al.
9,009,230 B1 4/2015 Matthieu et al.
(Continued)

OTHER PUBLICATIONS

Urnes et al., "Using Mobile Code to Build a Smart Kitchen," Personal Technologies, 2000, pp. 202-204.
(Continued)

*Primary Examiner* — Yu-Wen Chang
(74) *Attorney, Agent, or Firm* — Stinson LLP

(57) ABSTRACT

Systems, components, and methods for use in a commercial kitchen intelligence system. A network appliance and a plurality of kitchen components are coupled to a data communication network. The network appliance establishes a VPN connection with a portal remote to the commercial kitchen. The network appliance establishes communication with a point-of-sale (POS) system for receipt of POS data. The network appliance facilitates communication among the kitchen components on the data communications network independent of different protocols by which the kitchen components are configured to communicate.

19 Claims, 9 Drawing Sheets

Related U.S. Application Data continuation of application No. 15/795,813, filed on Oct. 27, 2017, now Pat. No. 11,223,498, which is a continuation of application No. PCT/US2016/029760, filed on Apr. 28, 2016.

(60) Provisional application No. 62/294,741, filed on Feb. 12, 2016, provisional application No. 62/203,716, filed on Aug. 11, 2015, provisional application No. 62/154,104, filed on Apr. 28, 2015.

(51) Int. Cl.
| | |
|---|---|
| *G06Q 10/087* | (2023.01) |
| *G06Q 10/10* | (2023.01) |
| *G06Q 20/14* | (2012.01) |
| *G06Q 20/20* | (2012.01) |
| *G06Q 20/38* | (2012.01) |
| *G06Q 50/12* | (2012.01) |
| *H04L 67/12* | (2022.01) |
| *H04L 67/562* | (2022.01) |
| *H04L 12/46* | (2006.01) |

(52) U.S. Cl.
CPC ........... *G06Q 10/10* (2013.01); *G06Q 20/145* (2013.01); *G06Q 20/202* (2013.01); *G06Q 20/382* (2013.01); *G06Q 50/12* (2013.01); *H04L 67/12* (2013.01); *H04L 67/562* (2022.05); *H04L 2012/285* (2013.01); *H04L 12/4641* (2013.01)

(58) Field of Classification Search
CPC .. G06Q 10/0631; G06Q 10/087; G06Q 10/10; G06Q 20/145; G06Q 20/202; G06Q 20/382; G06Q 50/12; G06Q 20/308
See application file for complete search history.

(56) References Cited

U.S. PATENT DOCUMENTS

| | | |
|---|---|---|
| 2002/0033760 A1 | 3/2002 | Kobayashi |
| 2004/0028035 A1 | 2/2004 | Read |
| 2004/0258059 A1 | 12/2004 | Frank et al. |
| 2005/0228926 A1 | 10/2005 | Smith et al. |
| 2006/0184998 A1 | 8/2006 | Smith et al. |
| 2006/0259547 A1 | 11/2006 | Bogatin et al. |
| 2008/0115147 A1 | 5/2008 | Ding |
| 2008/0133646 A1 | 6/2008 | Azulai |
| 2009/0182574 A1 | 7/2009 | Beardall et al. |
| 2009/0271002 A1 | 10/2009 | Asofsky |
| 2009/0300721 A1 | 12/2009 | Schneider |
| 2010/0070636 A1 | 3/2010 | Skog et al. |
| 2011/0185398 A1 | 7/2011 | Kubota |
| 2012/0011233 A1 | 1/2012 | Dixon et al. |
| 2012/0323392 A1 | 12/2012 | Gerdes et al. |
| 2013/0035924 A1 | 2/2013 | Hoeh et al. |
| 2013/0111561 A1 | 5/2013 | Kaushik |
| 2013/0177029 A1 | 7/2013 | Kim et al. |
| 2013/0297042 A1 | 11/2013 | Reese et al. |
| 2014/0215065 A1 | 7/2014 | Fisher |
| 2014/0236527 A1 | 8/2014 | Chan et al. |
| 2014/0237585 A1 | 8/2014 | Khan et al. |
| 2014/0241373 A1 | 8/2014 | Pasam et al. |
| 2014/0289387 A1* | 9/2014 | Ghosh ................. H04L 41/0893 709/223 |
| 2014/0324973 A1 | 10/2014 | Goel et al. |
| 2015/0026007 A1 | 1/2015 | Mangalvedkar et al. |
| 2015/0149365 A1 | 5/2015 | Mobini |
| 2015/0195252 A1 | 7/2015 | Walter et al. |
| 2016/0036818 A1 | 2/2016 | Patesaria |
| 2016/0135241 A1 | 5/2016 | Gujral et al. |
| 2016/0218884 A1 | 7/2016 | Ebrom et al. |
| 2017/0134255 A1 | 5/2017 | Amini et al. |
| 2017/0201504 A1* | 7/2017 | Funk .................. H04L 63/0471 |
| 2018/0081331 A1 | 3/2018 | Gary, Jr. et al. |

OTHER PUBLICATIONS

Tewari et al., "Design and Networking Considerations for Face," Consumer Communications and Networking Conference, 2004. CCNC 2004. FI RST IEEE Las Vegas, NV, USA, Jan. 5-8, 2004, IEEE, 5 Jan. 5, 2004, pp. 471-476.

* cited by examiner

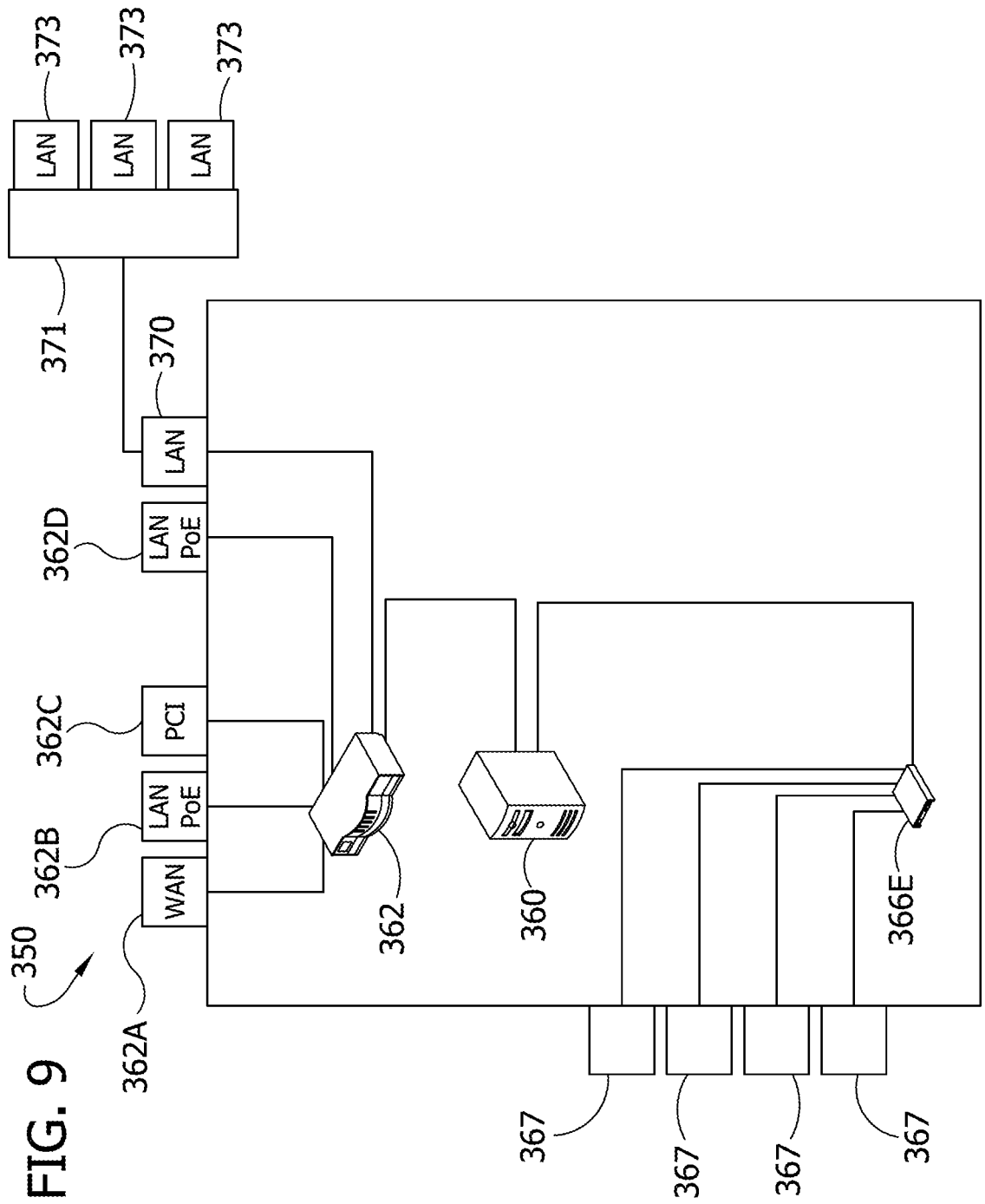

NETWORK SYSTEM HAVING A NETWORK APPLIANCE

CROSS-REFERENCE TO RELATED APPLICATIONS

This application is a continuation of U.S. application Ser. No. 17/643,994, filed Dec. 13, 2021, which is a continuation of U.S. application Ser. No. 15/795,813, filed Oct. 27, 2017 (issued as U.S. Pat. No. 11,223,498 on Jan. 11, 2022), which is a continuation of International Application No. PCT/US2016/029760, filed Apr. 28, 2016, which claims priority to U.S. Provisional Patent Application No. 62/154,104, filed Apr. 28, 2015, U.S. Provisional Patent Application No. 62/203,716, filed Aug. 11, 2015, and U.S. Provisional Patent Application No. 62/294,741, filed Feb. 12, 2016, all of which are hereby incorporated by reference in their entireties.

FIELD

The present disclosure generally relates to a computerized network, and more particularly to a network system having a network appliance.

BACKGROUND

Food preparation establishments such as restaurants, including quick service or fast food restaurants, have kitchens including several kitchen components. The kitchen components may be configured for communicating with other components by various protocols. It may be challenging to establish communication among components configured for communicating by different protocols. In addition, existing networks, if any, in these types of establishments are generally not particularly good and present integration challenges. Moreover, establishing remote communication with a network of kitchen components through a restaurant firewall can be challenging.

SUMMARY

A kitchen intelligence system embodying aspects of the invention permits integrating various kitchen components. To do so, the kitchen intelligence system establishes communication among components configured for communicating by different protocols.

One aspect of the present invention is directed to a commercial kitchen intelligence system. The system includes a plurality of kitchen components coupled to a data communication network. At least two of the kitchen components are configured to communicate according to different protocols. The system also includes a network appliance coupled to the data communication network. The network appliance includes a network appliance processor executing instructions for brokering communications among the kitchen components on the data communications network.

Another aspect of the present invention is directed to a network appliance for use in a commercial kitchen. The network appliance includes a network switch having a plurality of ports. At least two of the ports have kitchen components connected thereto via a data communication network. The kitchen components are configured to communicate according to different protocols. The network appliance includes an application server coupled to the switch for communicating with the kitchen components via the data communication network. The application server executes processor-executable instructions for brokering communications among the kitchen components. A virtual messaging bus is established to which the kitchen components are connected.

Another aspect of the present invention is directed to a commercial kitchen intelligence system for use with a remote portal. The system includes at least one kitchen component coupled to a data communication network. The system also includes a network appliance coupled to the data communication network. The network appliance includes a network appliance processor executing instructions for establishing a virtual private network connection with the remote portal over the Internet for permitting bi-directional communication between the network appliance and the remote portal.

Yet another aspect of the present invention is directed to a network appliance for a commercial kitchen network including a POS system and configured for communication with a remote portal over the Internet. The network appliance has an application server including a network appliance processor and a non-transitory computer-readable storage medium. The network appliance includes a first network port for connecting the network appliance to the POS system. The network appliance includes a second network port for connecting the network appliance to the Internet. The network appliance includes a network appliance housing supporting the application server and first and second network ports.

Other objects and features of the present invention will be in part apparent and in part pointed out herein.

BRIEF DESCRIPTION OF THE DRAWINGS

FIG. 9 is a diagram of a third embodiment of a network appliance.

Corresponding reference characters indicate corresponding parts throughout the drawings.

DETAILED DESCRIPTION

Figure 1:
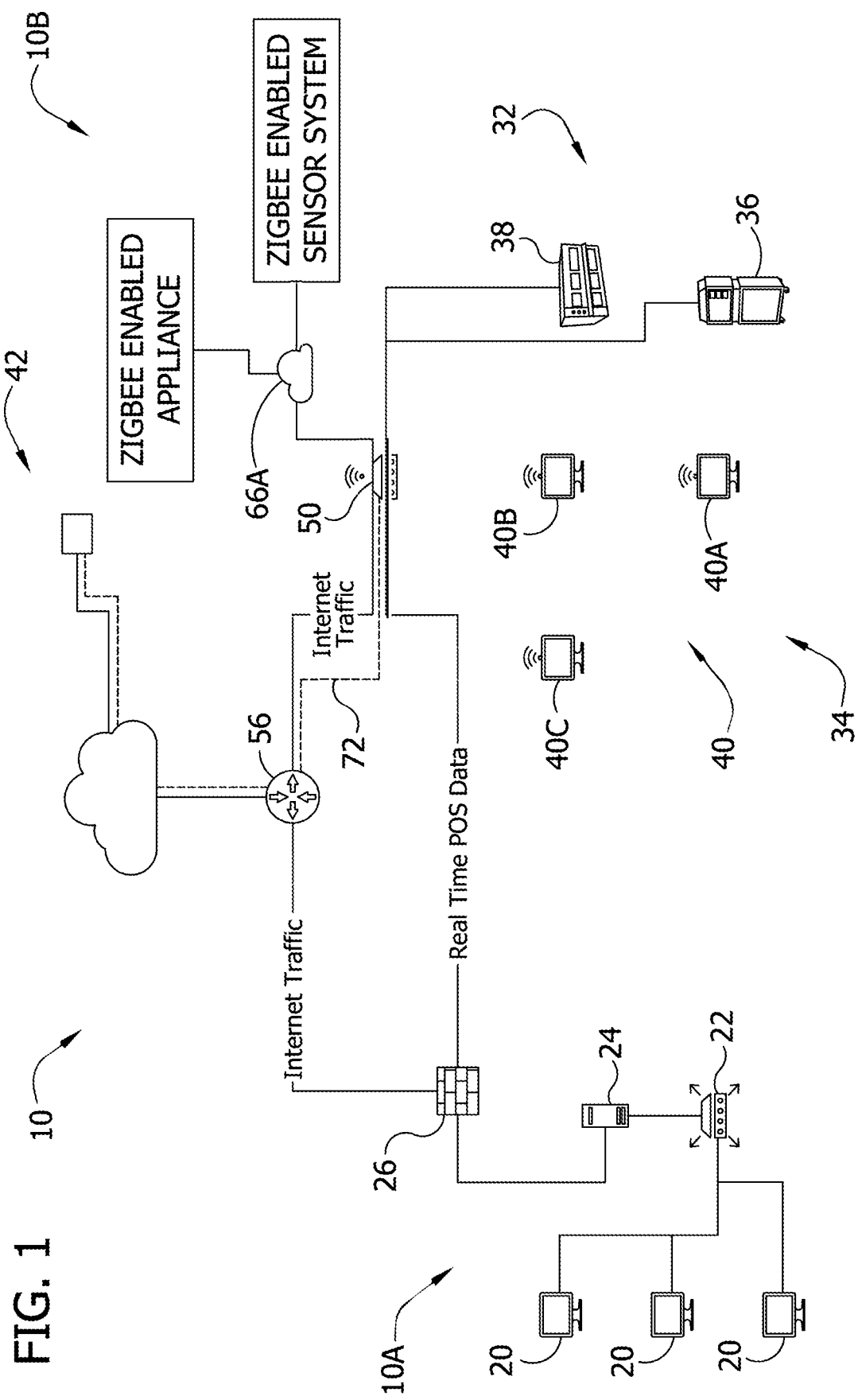
FIG. 1 is a diagram of a network system embodying aspects of the present invention.

Referring to the drawings, FIG. 1 illustrates one embodiment of a network system embodying aspects of the present invention, designated generally by the reference number 10. In the illustrated example, the system 10 is configured as a food preparation establishment network system for use in a food preparation establishment, such as a restaurant or other commercial kitchen, including a quick service or "fast food" restaurant. The system 10 can be used for "smart kitchen" purposes such as forecasting or predicting food that will be ordered in the future, preparing food, monitoring food preparation and food inventory, providing indications and instructions regarding food preparation and food inventory, labor scheduling management, asset tracking, smart appliance communication, sensor network integration, global inventory control, and facilitating communications between devices in the network for these and other purposes. As will become apparent, the network facilitates communication between various components of the network across a variety of communication protocols.

Referring still to FIG. 1, the system 10 in the illustrated embodiment includes a point-of-sale (POS) network 10A and a kitchen network 10B. The POS network 10A includes a plurality of POS terminals 20 for entering customer orders, a POS switch 22, a POS server 24, and a POS firewall 26. The kitchen network 10B includes components, such as food preparation apparatus 32 and control apparatus 34. The food preparation apparatus 32 may include various food cooking devices 36. An oven is shown in FIG. 1 as an example of one such cooking device, and it will be understood that other cooking devices, such as fryers, microwaves, dough conditioning cabinets, and grills can be used without departing from the scope of the present invention. The food preparation apparatus 32 may also include food holding apparatus 38 such as one or more food holding units adapted for holding food at a suitable temperature (e.g., cool temperature, ambient temperature, and/or warm temperature) such as a steam table, an infrared holding unit, a heat sink holding unit, or other holding unit, etc. The control apparatus 34 may include various devices such as local computers 40 and remote or offsite computers 42, any of which could take the form of various types of computers, including a tablet or hand-held computing device (e.g., smart telephone), desktop computer, or laptop computer, etc. The local computers 40 can be free-standing or mounted on or near food product preparation apparatus.

In the illustrated embodiment, local computers 40 include a plurality of user interfaces in the form of timer panels 40A, 40B for indicating food held in product holding units and associated hold times and a manager's panel 40C for displaying similar information and optionally additional information. The remote computers 42 may take the form of various computers, such as a tablet or other hand-held computing device (e.g., smart telephone), desktop computer, or laptop computer, etc. The remote computers 42 can provide access to information similar to the manager's panel 40C. As described in further detail below, the control apparatus 34 also includes a network appliance 50 facilitating communication between various components of the network system and serving various other purposes. For example, a food processing management system includes software executed by one or more of the control apparatus 34, such as the network appliance 50, as described further below.

In another aspect, the control apparatus 34, such as the network appliance 50, stores and executes software providing, for example, a suite of "smart kitchen" applications including food inventory and processing management, labor scheduling management, asset tracking, smart appliance communication, sensor network integration, global inventory control, and the like. One or more of the control apparatus 34 may be used instead of or in conjunction with the network appliance 50 for carrying out these operations. For example, the local computers 40 (e.g., timer panels 40A, 40B) may be in wired or wireless communication with the network appliance 50 and be positioned at various locations in the kitchen, such as adjacent food preparation apparatus 32 for which information displayed on the local computers pertains. In one embodiment, a timer panel 40A, 40B could be used for monitoring hold times of food in a food product holding unit 38 and be positioned adjacent or on the food product holding unit.

It will be appreciated that adapting an existing food preparation establishment such as a restaurant to have the food preparation establishment network system 10 can present many challenges. For example, many food preparation establishments, even if similar in nature, can have unique kitchen components, POS systems, and network characteristics. Food preparation establishments use various POS vendors, and even within the same vendor, POS systems often have custom configurations per store. Food preparation apparatus 32 pre-existing in a store have various communication capabilities (e.g., various communication protocols.) It will be appreciated that these and other aspects of food preparation establishments can present challenges to forming the kitchen network 10B, enabling communication between the variety of components of the kitchen network, providing bi-directional communication between the components of the kitchen network over the Internet (e.g., via an ISP gateway 56) with remote control apparatus (e.g., the remote computers 42), and providing communication between the kitchen network and the POS network 10A for supplying POS data to the control apparatus 34. These aspects of the system 10 are useful for fully enabling the control apparatus 34 to execute the smart kitchen applications and other purposes outlined above. As will become apparent, the network appliance 50 includes a variety of features that facilitate overcoming the above-mentioned challenges in establishing the system 10. The network appliance 50 makes establishment of such systems 10 at a relatively large commercial scale a reality, because installations are more efficient and less time consuming, as will become apparent.

Figure 2:
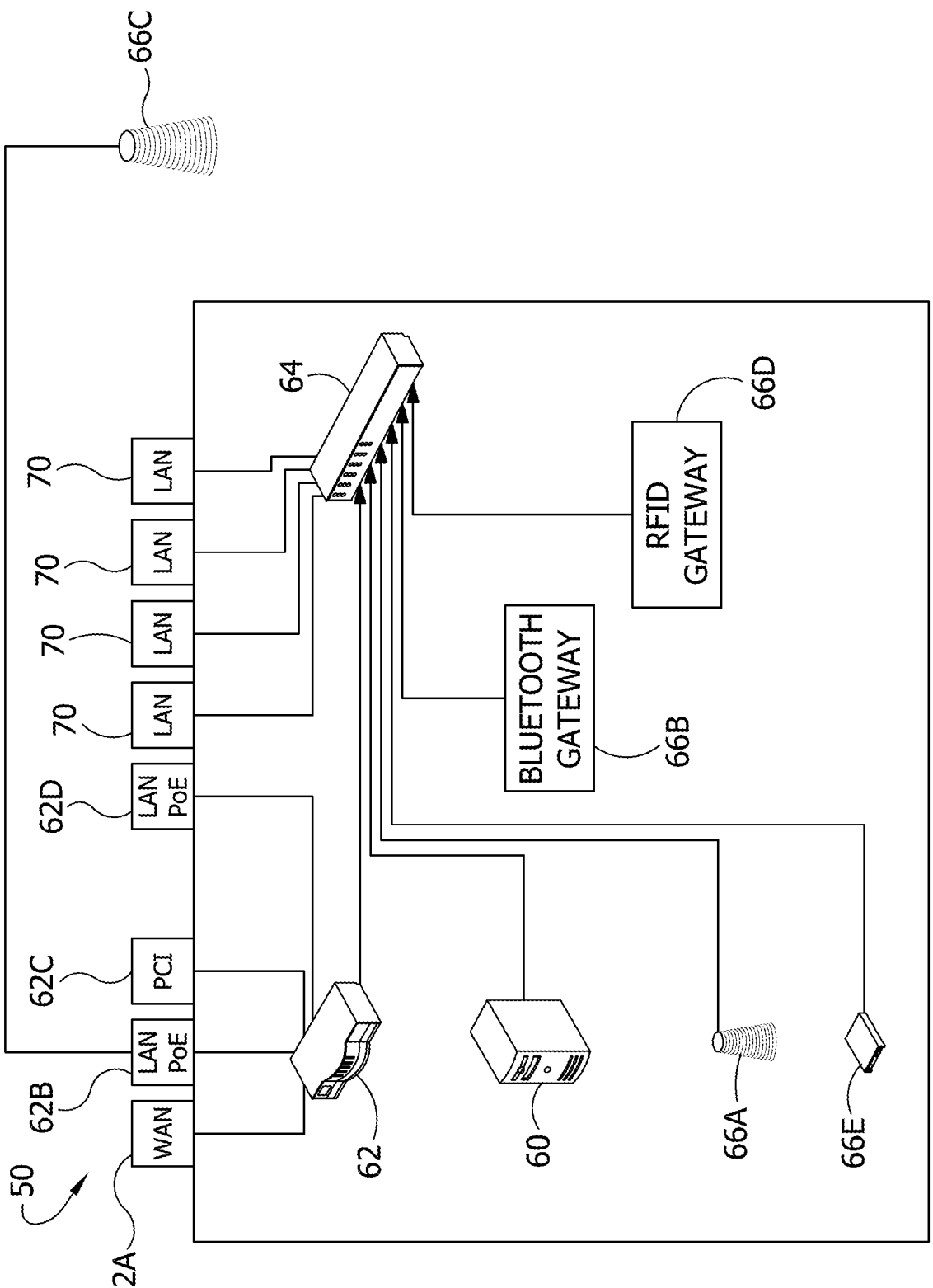
FIG. 2 is diagram of a network appliance of the network system of FIG. 1.
Figure 3:
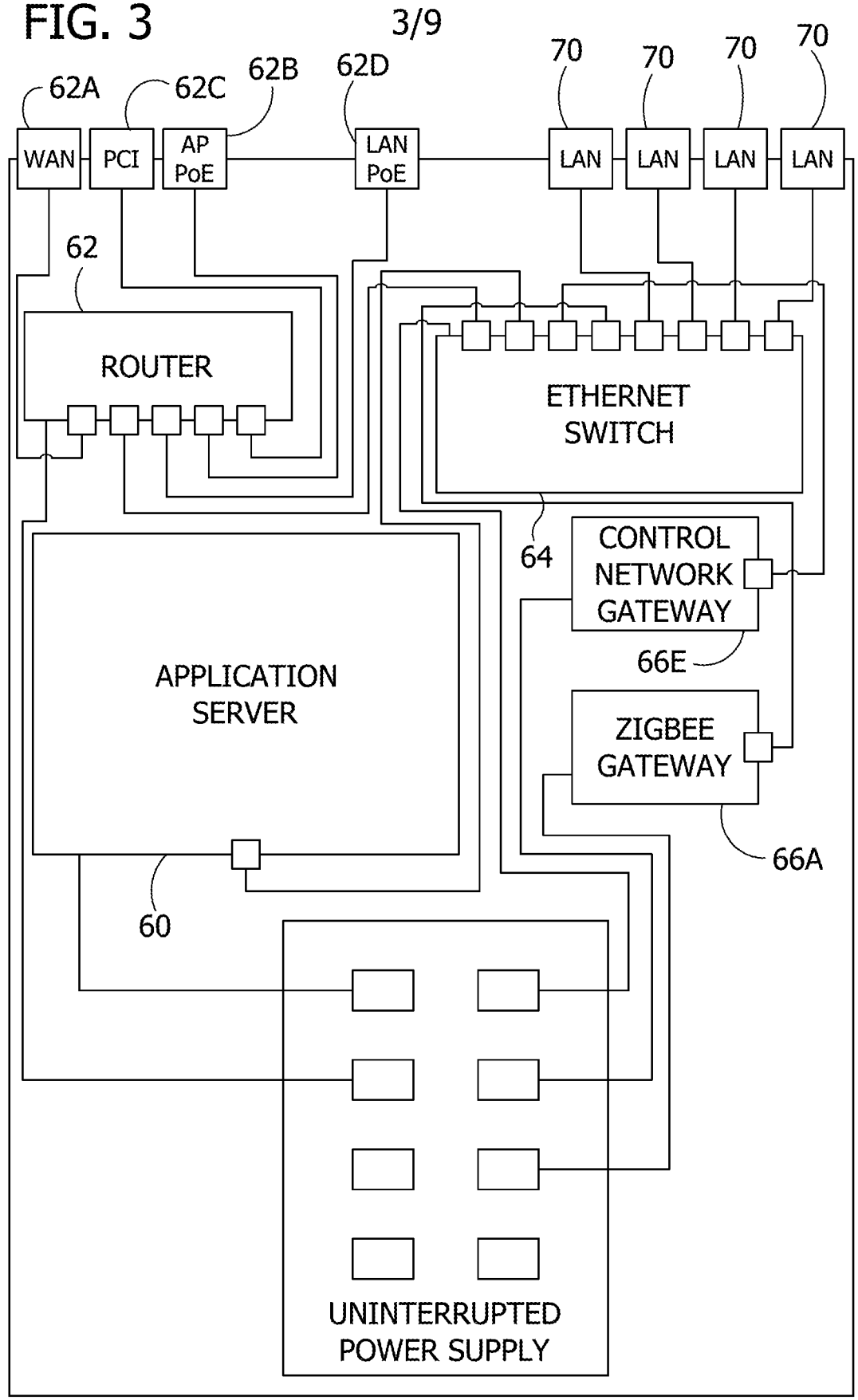
FIG. 3 is another diagram of the network appliance.

The network appliance 50 represents the central nervous system of the network system 10. The network appliance 50 is configured for facilitating communication between the various other components of the network system, notwithstanding the variety of communication protocols that may be used. The network appliance 50 is a hardware and software solution designed to bring value to the food preparation establishment or restaurant to permit communication integration of existing and future food preparation apparatus 32 and control apparatus 34. Referring to FIGS. 2 and 3, the network appliance 50 in the illustrated embodiment includes an application server 60, a network router 62, a network switch 64, and at least one communication protocol gateway 66A-66E. The network appliance 50 can take various physical forms. For example, the network appliance 50 may include a housing (e.g., represented schematically in FIG. 2) for housing the various components, and network connectors or ports may be mounted on the housing to be accessible from the exterior for making connections with the various components.

The application server 60 provides the computing engine that drives the center of the kitchen. Disparate workloads ranging from low level operating system tasks, high level business applications, statistical forecast engines, relational databases, network integration and coordination software, and system health and monitoring can all be executed with great speed and high levels of throughput. The application server 60 may have the following features and characteristics:

Dual core CPU clock speeds of 1-2 Ghz
4 GB of system RAM
32 GB of SSD Hard drive.
Hypervisor installed on the bare metal hardware
Guest Operating Systems running in Hardware Assisted virtualized mode Using a hypervisor provides the application server 60 with the advantage of doing "brain transplants" by downloading new appliances for major releases. The application server 60 is configured to leapfrog past device upgrade models, such as over the air firmware upgrades, that risk device failure due to inconsistent or broken data exchange (bricked devices). This strategy allows for higher confidence in releasing with a far lower chance of catastrophic failure.

The network router 62 provides a high level of network integration. The network router 62 brings its own network, and provides high security for bridging to networks, such as the POS network 10A, that contain sensitive PCI (Payment Card Industry) compliant data. For example, the router 62 can be a network switch (e.g., layer 3 network switch) that has routing capability and may be referred to herein as a router and/or a switch. The far side of the network integration, often times found lacking from a security standpoint, is segmented properly using the network appliance's advanced routing technology and physical port configurations. Having sufficient flexibility of physical network interfaces is a challenge of the low cost network routing space. The router 62 includes, for example, five WAN interface ports 62A, an Access Point Power over Ethernet port 62B, a PCI port 62C, and a LAN Power over Ethernet port 62D. Four of the five WAN ports 62A provide Power over Ethernet support in addition to the 10/100 Mbps data throughput measurements. The router 62 has the ability to physically segment a non-PCI compliant network (e.g., perhaps the POS network 10A) from a PCI compliant network (e.g., the kitchen network 10A). The router provides the ability to provide a physical LAN segment between the POS network 10A and the kitchen network 10B. The router provides the ability to be a VPN client to a master VPN server cluster.

As explained in further detail below, in an embodiment, the router 62 enables secure Reverse VPN connection, allowing for secure encrypted traffic originating from a control center portal in the cloud to enter the network appliance 50 and provide support/diagnostics, and updates with a secure connection to the cloud.

The router 62 has the ability to provide Access Point power and data via a single Category 5e cable via the AP PoE port 62B. The network router 62 is a substantial architectural component. In an effort to not pollute the existing network infrastructure with a large and growing number of network endpoints, the network router 62 abstracts the complexity of the Internet of Things from the existing premise network, while still offering the needed real time integration. Thus, the network appliance 50 provides a high level of routing technology.

The network switch 64 is, for example, an Ethernet switch for routing internal components in addition to external devices. The network switch 64 provides capacity for future network devices.

A variety of communication protocol gateways are contemplated. As shown in FIG. 2, a ZigBee gateway 66A, Bluetooth gateway 66B, Wi-Fi gateway 66C, RFID gateway 66D, and network interface gateway 66E can be used, and it will be understood that various other types of communication protocol gateways (e.g., NFC) can be used without departing from the scope of the present invention. The network appliance 50 has the capability to bridge multiple communication protocols and normalize to the de-facto standards of the internet age (Ethernet, TCP/IP, UDP).

The ZigBee gateway 66A, sitting atop the 802.15.4 wireless protocol and providing a wireless personal area network, provides a gateway to the Internet of Things including a variety of devices. The ZigBee gateway 66A provides an ability to bridge the 802.15.4 protocol specification using the globally approved 2.4 Ghz unlicensed spectrum for ZigBee. In one example, the ZigBee gateway 66A may provide communication ability with ZigBee enabled components such as appliances or sensor systems (e.g., HVAC systems, HACCP food temperature measurement systems, alarm systems, etc.).

The Wi-Fi gateway or access point 66C provides wireless connection to Wi-Fi enabled components, such as various food preparation apparatus 32 and/or control apparatus 34. The Wi-Fi access point 66C can be an enterprise grade outdoor IP rated (waterproof) 5 Ghz Wi-Fi access point providing a robust 5 Ghz smart channel spectrum. The network appliance 50 interoperates with the Wi-Fi access point 66C to provide high speed wireless access needed for the application systems run by the application server 60. The 5 Ghz unlicensed band allows for a much more robust wireless environment able to engage with the harsh kitchen environment of food preparation apparatus 32 such as microwaves, stainless steel, existing wireless communication systems, and public Wi-Fi for customers. For example, the Wi-Fi access point 66C may have an IP65 rated weatherproof enclosure and have operating temperature thresholds ranging from −30 C to +70 C to allow for harsh kitchen temperatures and provide an ability to extend the range and flexibility of wireless devices in a harsh commercial kitchen environment. The Wi-Fi access point 66C may use 23 non-overlapping channels for cleaner data reception and signal interference and "smart" channel selection to tune to the least congested segment of the spectrum. The Wi-Fi access point 66C allows for more thorough cleaning, flexibility of layout and design, and custom arrangement of devices. Wireless communications will be useful in kitchens of the future to help avoid infrastructure and maintenance costs for wiring/rewiring.

The network interface gateway 66E allows the network appliance 50 to bridge the past to the future. For example, older food preparation apparatus 32 and control apparatus 34 can be bridged for communication with new food preparation apparatus and control apparatus having newer communication protocols and other technology. Legacy control networks such as used on older food product preparation apparatus and control apparatus use various network architectures and standards (e.g., single-wire protocol). The network appliance 50 bridges older devices to newer devices through the hardware interconnects and the software systems. Using the network interface gateway 66E, the network appliance 50 can connect to legacy control networks (e.g., BACnet, RS-485 control networks, RS-232 devices) to bridge to established protocols, providing the ability to use legacy systems elongating their usable lifetimes, and providing longer ROI paths to existing CapEX purchases. The network interface 66E may include a single board computer with various wireline protocol interconnects, such as, Serial Peripheral Interface (SPI), I2C (I2C), Control Area Network (CAN), RS-485, RS-232, and have several (e.g., sixty or more) general purpose input/output pins.

Broadly speaking, the gateways 66A-66E described above can be said to provide network connections between the network appliance 50 and other components of the network system 10. Still other network connections can be provided by hardwired network connections. For example, as shown in FIG. 2, all of the ports of the router 62, including the WAN ports 62A (e.g., for connecting to the Internet, etc.), AP Power over Ethernet port 62B (e.g., for connecting to the Wi-Fi gateway 66C), PCI port 62C (e.g., for connecting to the POS network), and LAN Power over Ethernet port 62D, may be considered network connections of the network appliance 50. The network appliance 50 also includes several LAN ports 70 via the network switch 64 providing network connections for wired connection to various components, such as food preparation apparatus 32 and control apparatus 34.

As an example, assume an existing food preparation establishment decides it would like to have capabilities provided by one or more of the "smart kitchen" applications and features outlined above. Perhaps the food preparation establishment desires to have the suite of applications including, for example, food inventory and processing management, labor scheduling management, asset tracking, smart appliance communication, sensor network integration, global inventory control, and the like. To establish the system 10 to enable the operation of such programs, the network appliance 50 and the local computers 40A, 40B, 40C will be installed. Prior to installation of the local computers 40A, 40B, 40C, the network appliance 50 will be installed. Prior to installation of the network appliance 50, the food preparation establishment is asked to confirm or establish various software, hardware, and/or network components are properly configured for the appliance installation. For example, the food preparation establishment may be asked to provide the following:

Internet access with port forwarding
Reservation of appropriate router IP address for network appliance
Reservation of sibling IP address to POS server (as applicable)
Outbound access configurations
Inbound access configurations An initial step of installing the network appliance 50 is connecting the appliance to the Internet (e.g., via an ISP gateway, modem, or switch designated for the appliance) and connecting the appliance to the POS network 10A. The WAN port 62A and the PCI port 62C, respectively, and corresponding Ethernet cables are used for these purposes. Installation can be relatively simple in plugging the network appliance 50 into a power outlet and following an installation wizard. The application server 60 of the network appliance 50 stores instructions for establishing a connection with the remote portal (e.g., hosted by a remote computer 42) over the Internet, and for establishing communication with the POS network 10A. The network appliance 50 is programmed to work toward full connectivity with the remote computer 42 and POS network 10A, maintain that connectivity after established, and re-establish such connectivity if a break subsequently occurs.

Figure 4:
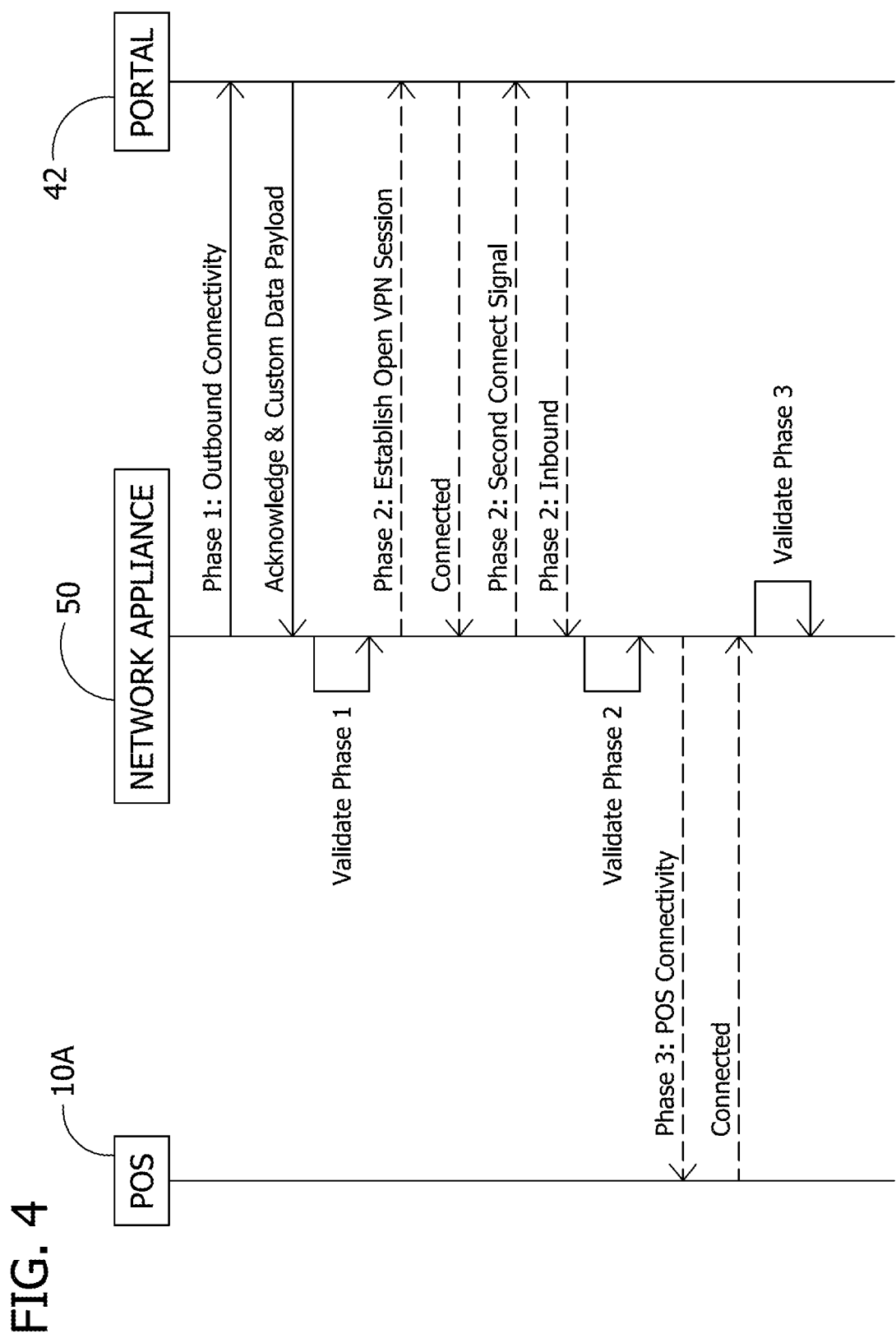
FIG. 4 is an exemplary representation of a dialog of communication between the network appliance and a portal for establishment of a reverse VPN connection, and between the network appliance and a point of sale system.

In one embodiment, the application server 60 of the network appliance 50 has instructions for establishing and maintaining a reverse virtual private network ("VPN") connection for communication with a portal hosted by a remote computer 42. An example sequence of communication for establishment of such a reverse VPN connection is illustrated in FIG. 4. In a first phase, the network appliance 50 seeks outbound connectivity over the Internet with the portal 42. In response to such a signal from the network appliance 50, the portal 42 responds with an acknowledgement signal and custom data payload (e.g., VPN credentials). After validation of the first phase, in a second phase, the network appliance 50, from the trusted location inside the food preparation establishment, executes stored software to signal the portal 42 to establish a VPN session. The portal 42 responds with a connection signal. The network appliance 50 transmits a second connect signal to the portal 42, and in turn, the portal sends an inbound signal, thus establishing bi-directional communication via the VPN session. Progression in the steps of establishing the VPN connection is monitored by the network appliance 50 and portal 42, and can be communicated to food preparation establishment personnel and network appliance manufacturer for updating them on status of installation and notification of installation errors, etc. The established VPN connection is shown schematically in FIG. 1 and indicated generally by the reference number 72.

It will be appreciated that use of the VPN connection 72 in this food preparation establishment context provides several advantages. At a basic level, the VPN connection 72 provides a "tunnel" through the firewall to the portal. The VPN connection 72 provides a reliable, secure tunnel for bi-directional communication between the portal 42 and the kitchen network 10B. It will be appreciated that kitchen network components, whether pre-existing or subsequently installed, can be connected to the portal 42 via the network appliance 50 and VPN connection 72 without having to separately transit the firewall (e.g., without having to reconfigure the firewall of the network appliance). Such communication can enable remote access by food establishment personnel to all aspects (e.g., programming, monitoring, etc.) of the components of the kitchen network 10B and access to the suite of "smart kitchen" applications remotely. Moreover, it will be appreciated that the VPN tunnel 72 provides a reliable pathway for manufacturers to remotely communicate with smart kitchen appliances 32 for firmware updates and other purposes.

After establishment of the VPN connection 72, the network appliance 50 executes stored software for establishing communication with the POS system 10A. Referring again to FIG. 4, the network appliance 50 seeks POS connectivity, and the POS signals the network appliance when connectivity is established. In one embodiment, data communicated from the portal to the network appliance 50 during or after establishment of the VPN session can be customized settings such as POS network information useful in establishing POS connectivity. For example, such information includes whether to connect with the POS system 10A by "listening" for a signal "pushed" from the POS system or by "requesting" or "pulling" information from the POS system. When phase three has been validated, communication with the POS network 10A has been established. As with establishment of the VPN connection, the network appliance 50 and portal 42 can monitor the progress of establishment of the POS connection and communicate related information to the food preparation establishment personnel and network appliance manufacturer. The POS connection is made in a PCI-compliant manner, and enables communication of POS data to the control apparatus 34 for use in the suite of applications outlined above as needed.

Another step in forming the network system 10 is establishing communication of the various kitchen network components with the network appliance 50. It will be understood that an existing commercial kitchen may include components (control apparatus 34 and preparation apparatus 32, etc.) made by various manufacturers. The components may not be made to communicate with each other by a common protocol or may not otherwise have compatible communication capabilities. For example, a food product holding unit 38 configured for single-wire or serial protocol communication is incapable of directly communicating with an oven 36 configured for LAN or Wi-Fi protocol communication. According to the present invention, the network appliance 50 enables communication with and between these types of components notwithstanding the difference in communication protocols.

Figure 5:
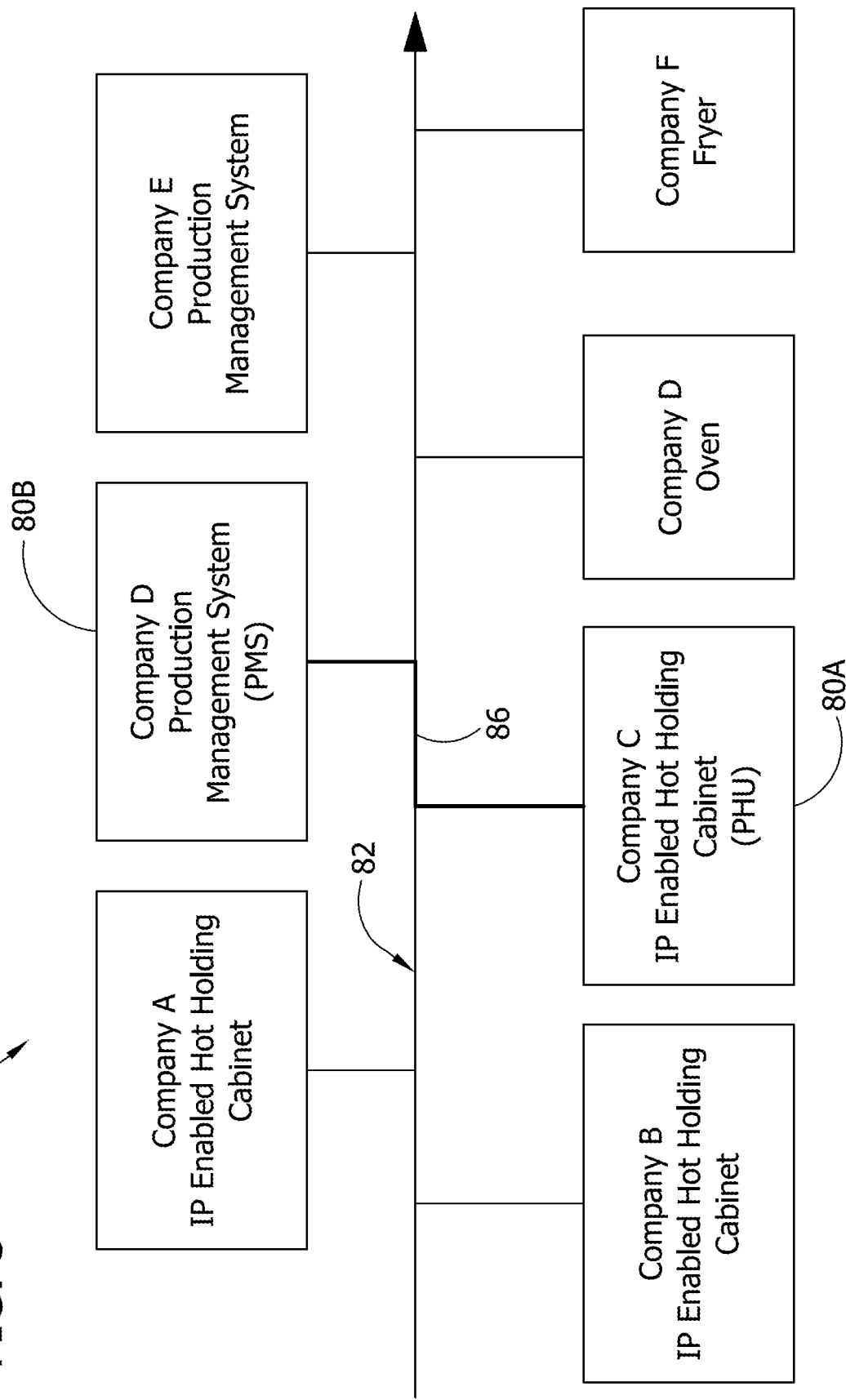
FIG. 5 is an exemplary diagram of agents connected to a data bus of the network system, including a line representing communication between an agent on behalf of a food product management system and an agent on behalf of a food product holding unit.

To enable communication across the variety of communication protocols, the application server 60 stores and executes software that provides a messaging middleware standard (e.g., layer 7 OSI model standard) to provide application gateways to lower layer protocols in ZigBee, Ethernet, Wi-Fi, RS-485, RS-232, etc. The software may be referred to as protocol translation and information brokering software. As shown in FIG. 5, the software defines a plurality of virtual smart agents 80 associated with respective devices (e.g., food preparation apparatus 32 and control apparatus 34) and a virtual data bus 82 connecting the smart agents. In the illustrated embodiment, agents 80 are shown representing various food preparation apparatus 32 and control apparatus 34. The apparatus may be manufactured by different companies (e.g., Company A, Company B, etc.), and therefore configured to communicate according to different protocols rather than a common protocol.

In an embodiment, the agents 80 are software modules that function as finite state machines, each acting as a protocol proxy. The agents 80 are configured for translating information from the specific protocol supported by the represented component to an agnostic protocol, and vice versa. The agnostic protocol is used for communication between the agents 80. The agents 80 can publish and subscribe to information on the data bus 82 using the agnostic protocol. A virtual broker 84 brokers information among the agents 80 according to subscriptions of the agents. Thus, the network appliance 50 facilitates operational intelligence across a wide variety of equipment, providing a bridge to equipment via hardware and software interconnects.

Figure 6:
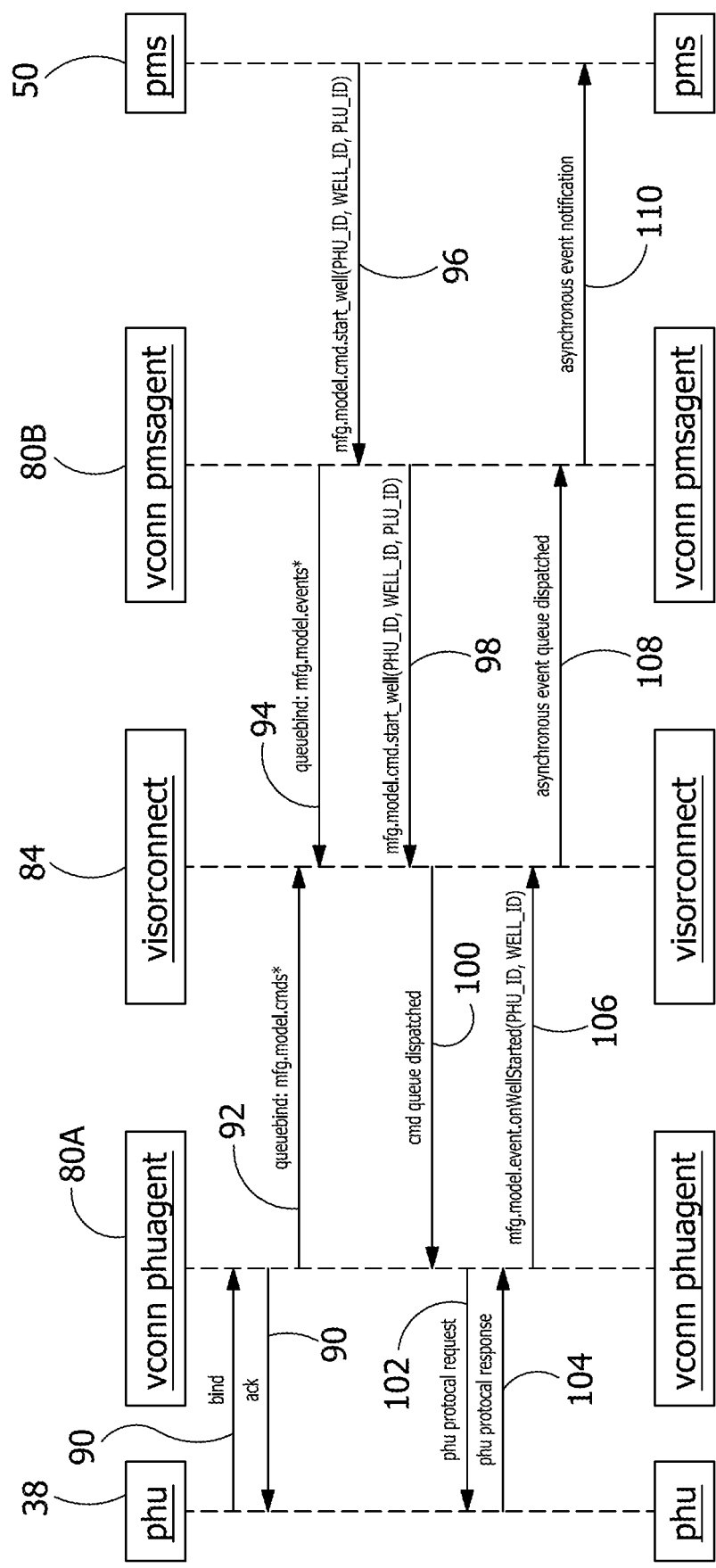
FIG. 6 is an exemplary representation of a dialog of communication between the product management system and the product holding unit via the respective agents and the data bus of FIG. 4.

An example communication between a food processing management system (e.g., the network appliance 50 executing food processing management system software) and food holding unit 38 via the protocol translation and information brokering software is represented in FIG. 5 as a bolded line 86 extending along the data bus 82 between respective agents 80A, 80B. An example dialog between the food processing management system 50 and the food product holding unit 38 via respective agents 80A, 80B is shown in FIG. 6. In a first communication 90, the product holding unit 38 signals the associated agent 80A to bind, and the agent signals an acknowledgement to the product holding unit. In a second communication 92, the PHU agent 80A signals the virtual broker to subscribe the agent to commands published to the data bus 82 for the PHU. In a third communication 94, the agent 80B for the food processing management system 50 signals the virtual broker to subscribe to events relating to the PHU 38. In a fourth communication 96, the food processing management system 50 signals its agent 80B to send a "start holding well" signal to the PHU 38. The communication from the food processing management system 50 can occur in a particular protocol. In response to the communication, the agent 80B publishes a holding well start signal 98 in the agnostic protocol to the data bus 82, essentially translating the communication. Pursuant to the subscription of the PHU agent 80A to PHU command signals, the broker 84 transmits the holding well start signal 100 to the PHU agent in the agnostic protocol. In an embodiment, the middleware software executing on the application server transmits the command from a queue. The PHU agent 80A translates the holding well start signal from the agnostic protocol to a protocol used by the PHU 38 and signals 102 the PHU in that protocol to start the holding well. The PHU 38 communicates to the processing management system 50 that the holding well has been started in a manner similar to that described with respect to the holding well start signal, but in the reverse order. The PHU signals 104 the PHU agent 80A to send a holding well started signal, the PHU agent 80A publishes a signal 106 to the data bus 82 in the agnostic protocol, the broker 84 transmits a signal 108 to the food process management system agent 80B according to the subscription for PHU events, and the food process management system agent signals 110 the food process management system 50. It will be understood these communications are provided by way of example without limitation, and various other information or data may be communicated among devices in the network via the protocol translation and brokering software.

As is now apparent, installation of the network appliance 50 greatly facilitates networking of the kitchen components, establishing communication with the remote portal 42, and establishing communication with the POS network 10A. Also, the network appliance 50 enables the operation of the suite of "smart kitchen" applications outlined above. Moreover, it will be appreciated, the network appliance 50 provides the additional advantage of permitting reliable, secure bi-directional communication over the VPN tunnel 72 for various purposes, such as to update firmware of food preparation apparatus of the kitchen network. The host of the remote portal 42 can provide access to the kitchen network 10B and/or specific food preparation apparatus 32 or computers 40 of the kitchen network to third parties, such as the manufacturers of the respective components, via the VPN tunnel 72 for various purposes.

Figure 7:
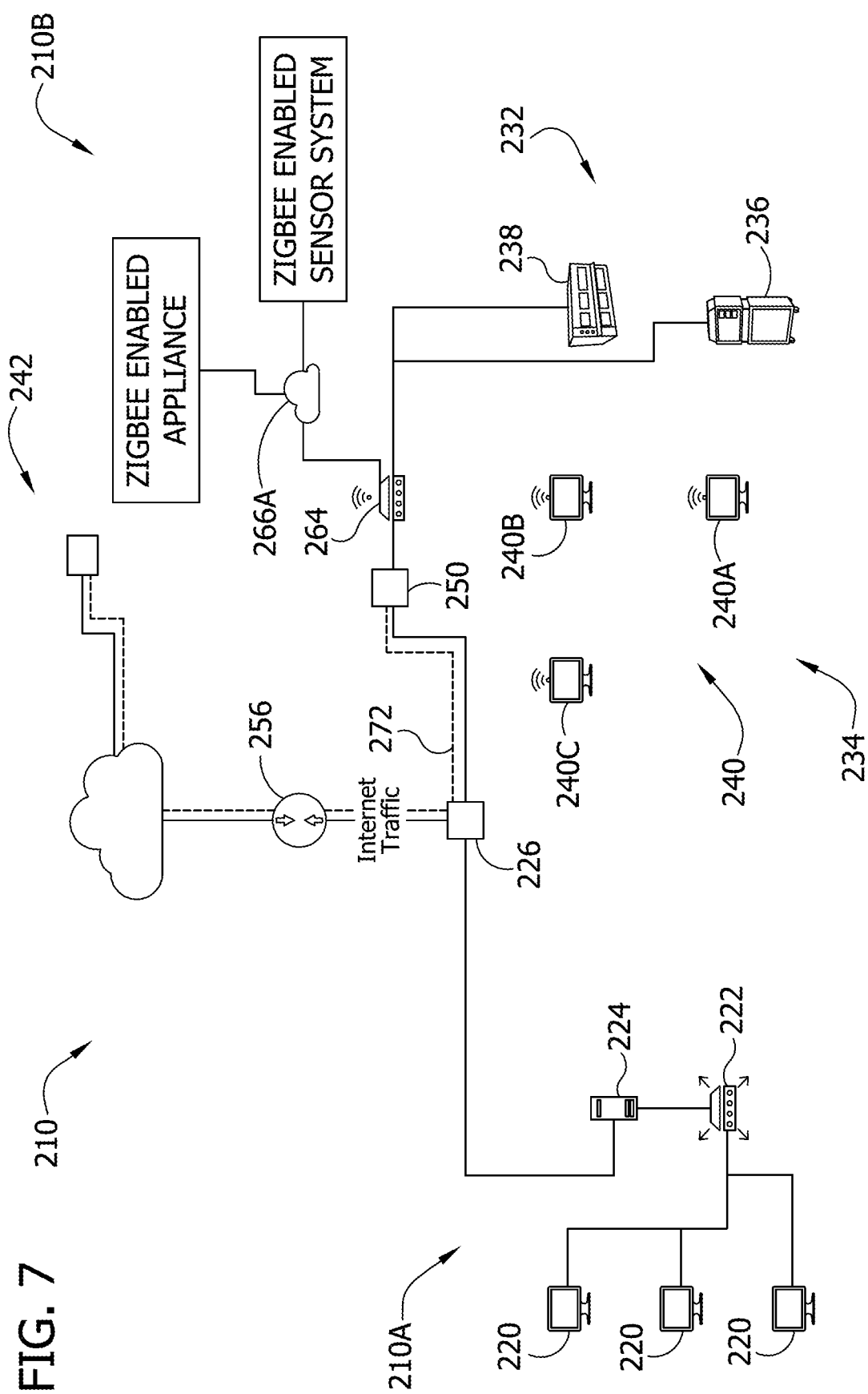
FIG. 7 is a diagram of a second embodiment of a network system embodying aspects of the present invention.

Referring now to FIG. 7, a second embodiment of a network system embodying aspects of the present invention is designated generally by the reference number 210. The network system of this embodiment is similar to the network system 10 described above with respect to FIGS. 1-6, and like parts are designated with like reference numbers, plus 200. For example, in this embodiment, the system 210 includes a POS network 210A with a plurality of POS terminals 220, a POS switch 222, and a POS server 224. The system 210 also includes a kitchen network 210B including food preparation apparatus 232 (e.g., food cooking devices 236 and food holding apparatus 238) and control apparatus 234 (e.g., local computers 240A-240C and remote computers 242).

Figure 8:
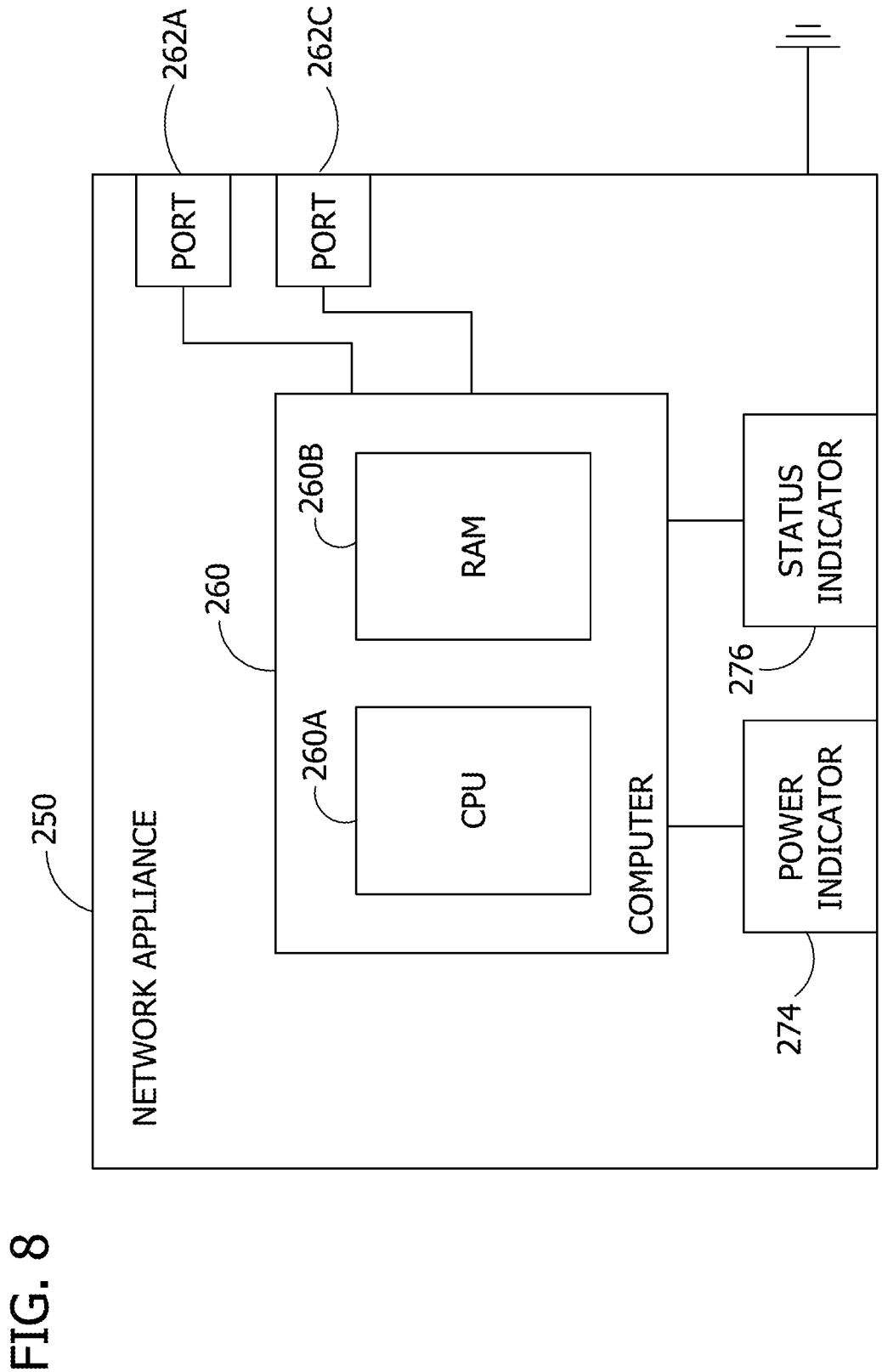
FIG. 8 is a diagram of a network appliance of the network system of FIG. 7.

The network appliance 250 has a simpler construction relative to the network appliance 50 described above. Referring to FIG. 8, the network appliance 250 includes a single chip computer 260 (broadly "application server"). In one embodiment, the single chip computer has an ARM based CPU 260A (broadly "network appliance processor") running at speeds of 1 GHz and 512 MB of RAM 260B (broadly "non-transitory computer-readable storage medium") and is supplied with 5 volts power. The network appliance 250 also includes first and second network ports 262A, 262C (e.g., RJ45 ports) for connection to the POS system 210A and Internet (e.g., via ISP gateway, modem, or switch designated for the network appliance), respectively. Desirably, the network appliance 250 also includes a power indicator 274, and a status indicator 276. In one example, the network appliance 250 includes a relatively simple housing or case (e.g., shown schematically in FIG. 8) supporting and enclosing the single chip computer and supporting the ports and indicators.

Referring again to FIG. 7, it will be appreciated the network appliance makes use of the restaurant firewall 226, instead of having its own firewall as in the first embodiment. Moreover, the network appliance makes use of a separate switch 264, instead of a switch (e.g., switch 64) onboard the network appliance. Accordingly, in this embodiment, the network appliance 250 makes use of existing or separately supplied network infrastructure (e.g., switch 264, firewall 226, communication gateways, etc.) in the food preparation establishment instead of providing it onboard the network appliance.

The network appliance 250 of this embodiment provides several of the same advantages as the network appliance 50 described above. For example, the network appliance 250 executes instructions stored in the memory 264 for establishing a VPN connection 272 over the Internet (e.g., via an ISP gateway 256) with a portal hosted by an offsite computer 242. After physical connection of the network appliance 250 to the Internet and to the POS network 210A via the network ports 262A and 262C, the process for establishment of the VPN tunnel would proceed exactly as described above with respect to FIG. 4. Moreover, the network appliance 250 executes stored instructions for establishing communication with the POS network, as described above with respect to FIG. 4. Additionally, the network appliance 250 executes stored instructions to establish a virtual data bus and facilitate communication among various networked components, as described above with respect to FIGS. 5 and 6.

The indicators 274, 276 of the network appliance 250 are useful in indicating to the user at the food preparation establishment status of the network appliance. For example, the power indicator 274 is in an active state (e.g., illuminated) whenever power is supplied to the network appliance 250. The status indicator 276 indicates status of the various connections made by the network appliance and the indicator changes to different indicator states to indicate different states of connection. For example, in one embodiment, the status indicator 276 is in an inactive state when the network appliance 250 has power but has not yet started establishing connections. When the network appliance 250 is working to establish the outbound connectivity with the remote portal 242, the status indicator blinks or flashes relatively slowly. After outbound connectivity with the remote portal 242 is established, and while the network appliance 250 is working to establish inbound connectivity with the remote portal, the status indicator 276 blinks or flashes at a relatively intermediate speed. After the VPN session 272 is established, and while the network appliance is working to establish communication with the POS system 210A, the status indicator blinks or flashes at a relatively fast speed. Finally, after communications with the remote portal 242 and the POS system 210A have been established, the status indicator 276 maintains a steady active state (e.g., constant illumination). It will be appreciated that the indicators 274, 276 can be provided and used in a similar fashion in the previous embodiment.

Accordingly, the network appliance 250 enables network connectivity and communication for the suite of "smart kitchen" applications outlined above, which may be executed by one or more of the control apparatus 234. Moreover, it will be appreciated, the network appliance 250 provides the additional advantage of permitting reliable, secure bi-directional communication over the VPN tunnel 272 for various purposes, such as to update firmware of food preparation apparatus of the kitchen network. As with the previous embodiment, the host of the remote portal 242 can provide access to the kitchen network 210B and/or specific food preparation apparatus 232 or computers 240 of the kitchen network to third parties, such as the manufacturers of the respective components, via the VPN tunnel 272 for various purposes. Like the network appliance 50, this network appliance 250 can be installed in conjunction with the local computers 240A, 240B, 240C to provide reliable network connectivity and communication across various communication protocols with kitchen network components and fully enabling the suite of smart kitchen applications.

Referring now to FIG. 9, a third embodiment of a network appliance embodying aspects of the present invention is designated generally by the reference number 350. The network appliance of this embodiment is similar to the network appliance 50 described above with respect to FIGS. 1-6, and like parts are designated with like reference numbers, plus 300. For example, the network appliance 350 includes an application server 360 and a router 362. The application server 360 can have the same construction and perform the same functions explained above with respect to the application server 60. The network appliance 50 also includes a network interface gateway 366E (broadly, a "communication protocol gateway"). It will be understood that the network appliance 350 can be used in place of the network appliance 50 in the network system 10 shown in FIG. 1, to perform the same functions of the network appliance 50 explained above.

Like the network router 62, the network router 362 provides a high level of network integration. The network router 362 brings its own network, and provides high security for bridging to networks, such as the POS network 10A, that contain sensitive PCI (Payment Card Industry) compliant data. For example, the router 362 can be a network switch (e.g., a layer 3 network switch) that has routing capability and may be referred to herein as a router and/or a switch. The far side of the network integration, often times found lacking from a security standpoint, is segmented properly using the network appliance's advanced routing technology and physical port configurations. Having sufficient flexibility of physical network interfaces is a challenge of the low cost network routing space. The router 362 includes a plurality of ports for making network connections. For example, router 362 has a WAN interface port 362A (e.g., for connecting to the Internet), an Access Point Power over Ethernet port 362B (e.g., for connecting to the Wi-Fi gateway 66C), and a PCI port 362C (e.g., for connecting to the POS network 10A). The router 362 in the illustrated embodiment also includes a LAN Power over Ethernet port 362D and a LAN port 370, both of which could be used for connecting to various food preparation apparatus 32. Additional ports and/or other ports can be provided without departing from the scope of the present invention. For example, an expansion switch 371 having LAN ports 373 can be used for connecting to additional food preparation apparatus 32 or other devices. The router 362 has the ability to physically segment a non-PCI compliant network (e.g., perhaps the POS network 10A) from a PCI compliant network (e.g., the kitchen network 10B). The router 362 provides the ability to provide a physical LAN segment between the POS network 10A and the kitchen network 10B. The router 362 provides the ability to be a VPN client to a master VPN server cluster, as explained above, for enabling secure reverse VPN connection.

The network interface gateway 366E (broadly "communication protocol gateway") allows the network appliance 350 to bridge the past to the future. For example, older food preparation apparatus 32 and control apparatus 34 can be bridged for communication with new food preparation apparatus and control apparatus having newer communication protocols and other technology. Legacy control networks such as used on older food product preparation apparatus and control apparatus use various network architectures and standards (e.g., single-wire protocol). The network appliance 350 bridges older devices to newer devices through the hardware interconnects and the software systems. In this embodiment, the network interface gateway 366E comprises a single board computer including RS-232 wireline protocol ports 367 configured for connecting to legacy RS-232 devices. For example, one or more of the ports 367 can be used for connecting to a legacy food holding unit 38, and/or one or more of the connectors can be used for connecting to a legacy local computer 40 operating a food management software.

Broadly speaking, the ports 367 of the gateway 366E and all of the ports of the router 362 may be considered network connections of the network appliance 350.

The network appliance 350 can take various physical forms. For example, the network appliance 350 may include a housing (e.g., shown schematically in FIG. 9) for housing the various components, and network connectors or ports may be mounted on the housing to be accessible from the exterior for making connections with the various components.

In an aspect of the present invention, components of the network systems 10, 210 can be used to implement a food preparation establishment virtual software application store. As explained above, the network appliance 50, 250, 350 can store and/or execute software applications. Such software applications can be accessible for free or purchased download by users at the food preparation establishment via the virtual store. In one embodiment, the remote computers or offsite portal 42, 242 can host a virtual store that is accessible via the cloud from the food preparation establishment, e.g., via one or more of the local computers 40, 240. Desired software applications can be downloaded from the virtual store and saved to, e.g., the network appliance 50, 250, 350 (or another component of the network system 10, 210). Accordingly, the application server 60, 260, 360 can be updated to include and execute various software applications selected by a user at the food preparation establishment. It will be appreciated that the connectivity the network appliance 50, 250, 350 facilitates in the network system 10, 210 enables implementation of a variety of different software applications. The software applications can take advantage of the networking of the various components in the food preparation establishment facilitated by the network appliance 50, 250, 350 and the VPN connection. The host of the remote portal 42, 242 can accept third party software application submissions and provide them for download via the virtual store. For example, the software applications can be directed to food inventory and processing management, labor scheduling management, asset tracking, smart appliance communication, sensor network integration, global inventory control, etc. The software applications can be directed for use with a particular component or a variety of components of the network system 10, 210. In one example, a manufacturer of a food preparation apparatus 32 sold to the food preparation establishment may desire to make a software application available in the virtual store that is usable in conjunction with the particular food preparation apparatus (and perhaps in conjunction with the local computers 40, 240). In another example, a sensor network provider may desire to offer a software application available in the virtual store such that the network appliance 50, 250, 350 facilitates connectivity of the sensors with each other in the food preparation establishment, with other components of the network system 10, 210, and/or with components remote from the store (e.g., via the VPN connection).

Although the network appliances 50, 250, 350 are described herein as being used in conjunction with local computers and for enabling the "smart kitchen" applications, it will be appreciated that various features of the network appliances are useful apart from such use. For example, the network appliances 50, 250, 350 can be used in a scenario without a "food processing management system" such as without local computers 40A, 40B, 40C or 240A, 240B, 240C for the purpose of facilitating communication between food preparation apparatus 32 or 232 using different native communication protocols, and for facilitating communication between offsite computers 42 or 242 with the networked kitchen components, such as for providing reliable, secure VPN connection 72 or 272 to food preparation apparatus for remotely updating firmware, etc. As explained above, the VPN connection 272 through the network appliance 250 facilitates remote Internet connection to later installed appliances because it can be done relatively easily through the existing VPN connection, desirably without having to reconfigure the restaurant firewall 226. In an embodiment, where a management system (e.g., local computers 40A, 40B, 40C or 240A, 240B, 240C) is not used, or the food preparation establishment is not interested in the capabilities such as food preparation forecasting, etc. requiring a POS data feed, the network appliance 50, 250, 350 does not need to be connected to the POS network 10A, 210A.

It will be appreciated that any of the network appliances 50, 250, 350 can be integrated in and thus be a part of any of the food preparation apparatus 32, 232 (e.g., food cooking devices 36, 236 and food holding apparatus 38, 238). A food preparation apparatus 32, 232 having the network appliance 50, 250, 350 onboard the apparatus could have the features and functionality described above with respect to the network appliances and could be referred to as a food preparation apparatus or a network appliance.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a general purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A commercial kitchen intelligence system for use with a remote portal, the system comprising:
    a plurality of kitchen components coupled to a data communication network;
    a network appliance coupled to the data communication network, said network appliance comprising a network appliance processor executing instructions for establishing a virtual private network connection with the remote portal over the Internet for permitting bi-directional communication between the network appliance and the remote portal; and
    a network switch having a plurality of ports, at least two of the ports having kitchen components connected thereto via the data communication network for selectively permitting communication between the remote portal and the plurality of kitchen components via the VPN connection.

2. The system of claim 1, wherein at least two of the kitchen components are configured to communicate according to different protocols, and wherein the network appliance processor executes instructions for brokering communications among the kitchen components on the data communications network.

3. The system of claim 2, wherein the network appliance comprises an application server having the kitchen components coupled thereto via the data communication network for communicating with the kitchen components via the data communication network, the application server executing the processor-executable instructions for brokering communications among the kitchen components, said instructions, when executed by the application server, establishing a virtual messaging bus to which the kitchen components are connected.

4. The system of claim 3, wherein the processor-executable instructions for brokering communications among the kitchen components comprise instructions for:
    executing a first agent to provide an interface between a first kitchen component communicating according to a first protocol and the virtual messaging bus; and
    executing a second agent to provide an interface between a second kitchen component communicating according to a second protocol different than the first protocol and the virtual messaging bus.

5. The system of claim 4, wherein the first and second agents establish a publish/subscribe messaging pattern therebetween on the virtual messaging bus.

6. The system of claim 4, wherein the first and second agents establish a message queue paradigm therebetween on the virtual messaging bus.

7. The system of claim 2, further comprising a non-transitory computer-readable medium having the processor-executable instructions for brokering communications among the kitchen components stored thereon.

8. The system of claim 2, further comprising one or more point-of-sale terminals coupled to the data communications network, said point-of-sale terminals communicating with one or more of the kitchen components via the network appliance.

9. The system of claim 2, wherein the plurality of kitchen components comprise one or more of the following: a product holding unit, a fryer, a microwave, a grill, a dough conditioning cabinet, or an oven.

10. The system of claim 2, wherein the network appliance includes the network switch.

11. The system of claim 1, wherein the kitchen components are configured to communicate according to different protocols, the system further comprising an application server coupled to the network switch for communicating with the kitchen components via the data communication network, the application server executing processor-executable instructions for brokering communications among the kitchen components, said instructions, when executed by the application server, establishing a virtual messaging bus to which the kitchen components are connected.

12. The system of claim 11, wherein the processor-executable instructions for brokering communications among the kitchen components comprise instructions for:
executing a first agent to provide an interface between a first kitchen component communicating according to a first protocol and the virtual messaging bus; and
executing a second agent to provide an interface between a second kitchen component communicating according to a second protocol different than the first protocol and the virtual messaging bus.

13. The system of claim 12, wherein the first and second agents establish one or more of the following: a publish/subscribe messaging pattern on the virtual messaging bus between the first and second agents, or a message queue paradigm on the virtual messaging bus between the first and second agents.

14. The system of claim 11, further comprising one or more network connections coupled to the network switch for connecting the kitchen components to the virtual messaging bus established by the application server.

15. The system of claim 14, wherein the network connections are configured to physically connect the kitchen components to the network switch via a local area network.

16. The system of claim 11, further comprising a network layer router configured for providing Payment Card Industry (PCI) compliant secure communications between one or more point-of-sale terminals and the application server.

17. The system of claim 1, further comprising a non-transitory computer-readable medium having the processor-executable instructions for establishing the VPN connection stored thereon.

18. The system of claim 9, wherein the network appliance includes the network switch.

19. The system of claim 1, wherein the network appliance comprises a non-transitory computer-readable medium having processor-executable instructions for, when executed by the network appliance processor, brokering communications among the kitchen components stored thereon.

* * * * *